Patented Mar. 11, 1924.

1,486,618

UNITED STATES PATENT OFFICE.

HERMANN THEM, OF DINGLINGEN, BADEN, GERMANY, ASSIGNOR TO CARBIC LIMITED, OF LONDON, ENGLAND, A BRITISH COMPANY.

MANUFACTURE OF CALCIUM-CARBIDE CAKES.

No Drawing. Application filed May 8, 1923. Serial No. 637,593.

*To all whom it may concern:*

Be it known that I, HERMANN THEM, a German citizen, residing at Dinglingen, Baden, Germany, have invented certain new and useful Improvements in or Relating to the Manufacture of Calcium-Carbide Cakes, of which the following is a specification.

This invention relates to the manufacture of calcium carbide cakes or blocks for use in generating acetylene in suitable generators, the calcium carbide cakes or blocks being of the kind in which the carbide granules are coated with a layer of fused sulphur (and sugar), as described in the specification of English Patent No. 1424 of 1909 (Wakefield). In this specification a mixture of sulphur and sugar is described as the coating agent and proportions are given which have hitherto been employed in practice. The chief object of the present invention is to improve the process of manufacture in a manner which will allow of substantial reduction, as compared with present practice, of the proportions of the sulphur and the sugar or equivalent ingredient, without impairing the valuable properties of the resulting product.

According to this invention, prior to the addition of the coating sulphur to the heated carbide we treat the carbide with a small percentage of a soluble metallic chloride or chlorides stable at the temperature employed in the process. Sodium chloride or common salt is especially suitable but potassium chloride or an alkaline earth metal chloride, such as calcium, barium or magnesium chloride, or a mixture of chlorides, may be used. The addition of the salt, which should be thoroughly dry, is preferably made when the carbide has been partly heated, say about midway in the usual heating operation, which is carried well above the fusing point of sulphur but kept below the temperature at which the sulphur would volatilise. Ordinary fine grained salt, preferably heated to obtain complete dryness, can be used in the treatment, about one-half per cent of the weight of the carbide being found sufficient to give the maximum benefit in economy of sulphur and sugar while improving the properties of the carbide cake.

The proportions of sulphur and sugar found practicable with this pre-treatment of the carbide are about 3.5 per cent of sulphur and 2 per cent of sugar, added as in the usual process. The proportion of sulphur required is reduced to less than half of that previously found necessary, resulting in a substantial economy in material. The sugar is also substantially reduced.

According to the present practice, in forming the blocks of granulated carbide considerable pressure is employed to provide a coherent block but when the sulphur and sugar are in reduced proportions, as now proposed, the pressure required to form a block which will maintain its coherence in use is greatly increased. It is found that a pressure of about 10 to 20 tons per square inch is desirable.

It is found that cakes made according to the improved process yield gas with increased regularity and steadiness and the generation of gas ceases in a shorter time after the water supply is stopped. The cake also dries readily and the waste falls away evenly as the cake is consumed.

It has been the practice to dip the cakes after formation, but while still warm, in a heavy oil, such as Mexican oil, and drain off the oil. We may employ, instead of oil, asphalt or bitumen varnish, preferably with a small proportion of oil, say 8 parts of varnish and 2 parts of oil, thinned somewhat with a proportion of naphtha or other spirit, the hot cakes being dipped in this mixture for about three minutes and drained.

What I claim and desire to secure by Letters Patent of the United States is:—

1. A process for the formation of calcium carbide blocks from granulated carbide by the aid of sulphur in a fused state, which consists in treating the carbide with a small percentage of a soluble metallic chloride stable at the temperature employed in the sulphur treatment and in subsequently coating the treated carbide with fused sulphur.

2. A process for the formation of calcium carbide blocks from granulated carbide by the aid of sulphur in a fused state, which consists in treating the carbide with a small percentage of an alkali metal chloride, and in subsequently coating the treated carbide with fused sulphur.

3. A process for the formation of calcium carbide blocks from granulated carbide by the aid of sulphur in a fused state, which consists in treating the carbide with a small percentage of common salt, and in subsequently coating the treated carbide with fused sulphur.

4. A process for the formation of calcium carbide blocks for granulated carbide by the aid of sulphur in a fused state, which consists in treating the carbide with a small percentage of mixed metallic chlorides stable at the temperature employed in the sulphur treatment and in subsequently coating the treated carbide with fused sulphur.

5. A process for the formation of calcium carbide blocks from granulated carbide by the aid of sulphur in a fused state, which consists in heating the carbide above the melting point but below the volatilising point of sulphur, adding to the granulated carbide at a stage about midway in the heating operation a small percentage of a soluble metallic chloride stable at the temperature employed in the sulphur treatment and in subsequently coating the treated carbide with fused sulphur.

6. In a process as claimed in claim 1, subjecting the sulphur treated product to a pressure of about 10 to 20 tons per square inch to form it into a coherent block.

7. The manufacture of calcium carbide blocks from granulated carbide by treating the carbide with a small percentage of a soluble metallic chloride stable at the temperature of the process, adding to the carbide after such treatment about 3½ per cent of sulphur and 2 per cent of sugar, subjecting the mixture to a temperature above the fusion point of sulphur and then subjecting the mixture to high pressure to form a coherent block.

8. In a process as claimed in claim 1, subjecting the sulphur treated product to a high pressure to form it into a coherent block and dipping the said block into asphalt or bitumen varnish.

9. In a process as claimed in claim 1, subjecting the sulphur treated product to a high pressure to form it into a coherent block and dipping the said block into asphalt or bitumen varnish with a small proportion of oil and a thinning spirit.

10. A calcium carbide block comprising granulated carbide, a small proportion of a soluble metallic chloride, and sulphur and sugar added to the granulated carbide in a fused form as a binding coating for the granules.

11. A calcium carbide block comprising granulated carbide, a small proportion of common salt, and sulphur and sugar added to the granulated carbide in a fused form as a binding coating for the granules.

HERMANN THEM.